United States Patent
Sturza et al.

(10) Patent No.: US 10,639,998 B2
(45) Date of Patent: May 5, 2020

(54) SERVICE DISCONNECT NOTIFICATION STRATEGY

(71) Applicant: Ford Global Technologies, LLC, Dearborn, MI (US)

(72) Inventors: John Sturza, Royal Oak, MI (US); Kevin Lloyd Newman, Farmington Hills, MI (US); Josephine S. Lee, Novi, MI (US); Masahiro Kimoto, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/958,004

(22) Filed: Apr. 20, 2018

(65) Prior Publication Data

US 2019/0322178 A1    Oct. 24, 2019

(51) Int. Cl.
| | | |
|---|---|---|
| *B25J 15/12* | (2006.01) | |
| *B60L 3/00* | (2019.01) | |
| *B60Q 5/00* | (2006.01) | |
| *B60L 58/10* | (2019.01) | |

(52) U.S. Cl.
CPC .............. *B60L 3/003* (2013.01); *B60L 58/10* (2019.02); *B60Q 5/005* (2013.01); *B60L 2210/42* (2013.01); *B60L 2240/427* (2013.01); *B60L 2240/526* (2013.01)

(58) Field of Classification Search
CPC ...... B60L 3/003; B60L 58/10; B60L 2210/42; B60L 2240/427; B60L 2240/526; B60Q 5/005; B60Q 5/008; H02J 7/0047; H04R 23/00
See application file for complete search history.

(56) References Cited

U.S. PATENT DOCUMENTS

| | | | |
|---|---|---|---|
| 5,547,208 A | 8/1996 | Chappell et al. | |
| 8,604,919 B2 | 12/2013 | Otterson | |
| 9,837,887 B1 * | 12/2017 | Zhou | H02P 27/08 |
| 9,931,949 B2 * | 4/2018 | Loftus | B60L 58/12 |
| 10,164,450 B2 * | 12/2018 | Masias | B60L 53/62 |
| 10,259,336 B2 * | 4/2019 | McQuillen | B60L 53/63 |
| 2002/0089862 A1 * | 7/2002 | Amei | H02M 3/33523 363/21.07 |
| 2013/0106590 A1 * | 5/2013 | Nakayama | B60Q 5/008 340/425.5 |
| 2013/0134933 A1 * | 5/2013 | Drew | H02H 5/04 320/109 |
| 2013/0265150 A1 * | 10/2013 | Nakayama | H04R 23/00 340/425.5 |

(Continued)

OTHER PUBLICATIONS

Cavallo et al., Supervised bidirectional DC/DC converter for intelligent Hybrid Electric Vehicles energy management, 2012, IEEE, p. 550-554 (Year: 2012).*

Hsu et al., On the implementation of CAN buses to battery management systems, 2011, IEEE, p. 1-4 (Year: 2011).*

Bockstette et al. Bidirectional current controller for combination of different energy systems in HEV / EV, 2012, IEEE, p. 1-5 (Year: 2012).*

(Continued)

*Primary Examiner* — Mcdieunel Marc
(74) *Attorney, Agent, or Firm* — Brooks Kushman PC

(57) ABSTRACT

A vehicle includes main contactors powered via a low voltage bus and disposed electrically between a traction battery and a high voltage bus, and a controller. The controller, responsive to the contactors remaining open following activation of the low voltage bus and reported voltage values associated with the high voltage bus being less than a threshold, operates a horn of the vehicle.

20 Claims, 4 Drawing Sheets

(56) References Cited

U.S. PATENT DOCUMENTS

| | | | |
|---|---|---|---|
| 2014/0300091 A1 | 10/2014 | Herz et al. | |
| 2015/0291044 A1* | 10/2015 | Adachi | H02J 7/0047 |
| | | | 320/134 |
| 2016/0352120 A1 | 12/2016 | Lovett et al. | |
| 2017/0106764 A1* | 4/2017 | Beaston | B60L 11/1838 |
| 2017/0155266 A1* | 6/2017 | Namou | H02J 7/0057 |
| 2017/0229886 A1* | 8/2017 | Eaves | H02J 7/0034 |
| 2017/0291543 A1* | 10/2017 | Goldman-Shenhar | B60Q 9/00 |
| 2018/0105060 A1* | 4/2018 | McQuillen | B60L 53/63 |
| 2018/0134169 A1* | 5/2018 | Loftus | H02J 7/0063 |
| 2018/0212476 A1* | 7/2018 | Nguyen | H02J 50/10 |
| 2018/0345819 A1* | 12/2018 | Cai | B60L 50/51 |
| 2019/0023130 A1* | 1/2019 | Garcha | B60L 1/02 |

OTHER PUBLICATIONS

Honey et al., Practical Considerations on the Electrical Safety of the High Power System in a Prototype EV, 2013, IEEE, p. 250-255 (Year: 2013).*

Bensai et al., Research on Electric-Vehicle Charging Station Technologies Based on Smart Grid, 2011, IEEE, p. 1-4 (Year: 2011).*

Chuansheng et al., Research of the charge mode of electric automobile charging station and the key technology of the control system, 2012, IEEE, p. 2788-2790 (Year: 2012).*

Bryden et al., Off-vehicle energy store selection for high rate EV charging station, 2017, IEEE, p. 1-9 (Year: 2017).*

Brenna et al., Optimal playing of electric vehicle charging stations, 2017, IEEE, p. 210-215 (Year: 2017).*

* cited by examiner

US 10,639,998 B2

SERVICE DISCONNECT NOTIFICATION STRATEGY

TECHNICAL FIELD

The present disclosure relates to systems and methods for a service disconnect notification system.

BACKGROUND

Hybrid-electric and other electrified vehicles utilize stored energy for propulsion. A traction battery may include a plurality of electrochemical cells connected to a bussed electrical center (BEC) via positive and negative battery terminals. The battery cells may have any suitable configuration and serve to receive and store electric energy for use in operation of the vehicle. Energy may be received from an electrical grid during a charging event, e.g., at a charging station connected to a power grid. An on-board motor may also generate energy during regenerative braking events. Electrified vehicles rely on various electrical systems to manage and distribute power to the various components. Electrified vehicles often utilize contactors and switches to manage the power flow between high-voltage electrical devices.

SUMMARY

A vehicle includes main contactors powered via a low voltage bus and disposed electrically between a traction battery and a high voltage bus, and a controller configured to, responsive to the contactors remaining open following activation of the low voltage bus and reported voltage values associated with the high voltage bus being less than a threshold, operate a horn of the vehicle.

A method for a vehicle includes, by a controller, responsive to main contactors, powered via a low voltage bus and disposed electrically between a traction battery and a high voltage bus, remaining open following activation of the low voltage bus and reported voltage values associated with the high voltage bus being less than a threshold, operating a horn of the vehicle or flashing exterior lights of the vehicle.

A system for a vehicle includes main contactors electrically powered by a low voltage bus and disposed electrically between a traction battery and a high voltage bus, and a controller configured to, responsive to the contactors remaining open following activation of the low voltage bus and reported voltage values associated with the high voltage bus being less than a threshold, operate exterior lights of the vehicle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An electrified vehicle may be equipped with a service disconnect component configured to selectively disable a high voltage system of the vehicle, such as during maintenance or repair by a service technician. In one example, removing the service disconnect may open the high voltage circuit of the vehicle causing high voltage controllers and other components of the high voltage system to discharge or power down.

A service tool may connect to the vehicle and may be configured to communicate with one or more vehicle controllers using an in-vehicle communication network. The service tool may be configured to receive voltage levels present at one or more controllers connected to the network. Thus, the service tool may display voltages of several vehicle controllers, but may be unable to determine that the voltages of all high voltage system controllers are less than a threshold and/or that a high voltage system of the vehicle has been discharged or powered down.

In some examples, responsive to detecting that a service disconnect has been removed and/or a high voltage circuit has been opened, a vehicle controller may be configured to determine whether any of the voltages received from the vehicle bus are greater than a threshold. The vehicle controller may issue a system discharge notification by causing headlights to flash and/or a vehicle horn to activate if all detected voltages are less than a threshold. Thus, the vehicle controller may use vehicle visual and audible indicators to inform the technician that a high voltage system may be powered down and high voltage system components discharged.

Figure 1A:
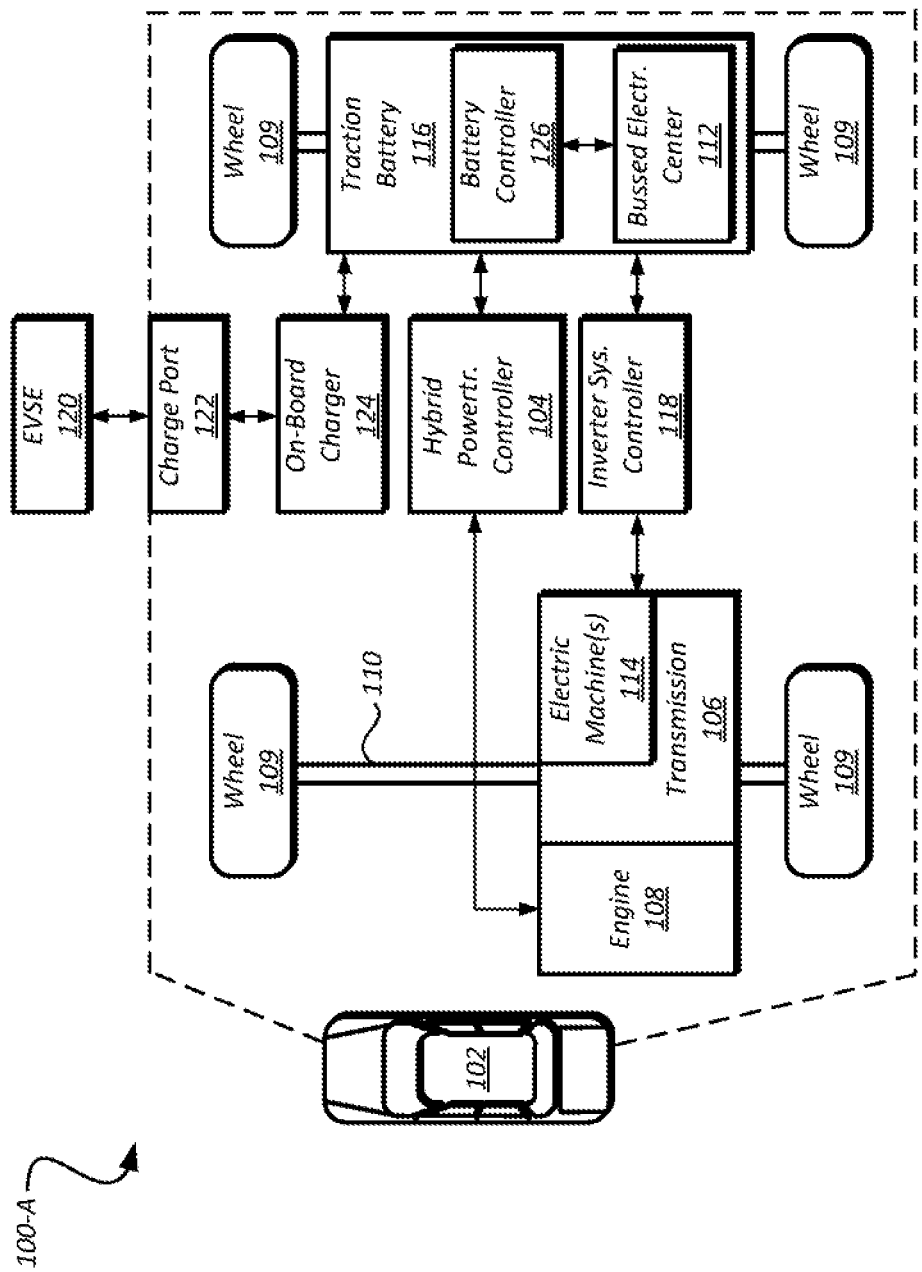
FIG. 1A is a block diagram of a plug-in hybrid electric vehicle (PHEV) illustrating a typical drivetrain and energy storage components.

FIG. 1A illustrates an example diagram of a system 100-A that may be used to provide telematics services to a vehicle 102. The vehicle 102 may be of various types of passenger vehicles, such as crossover utility vehicle (CUV), sport utility vehicle (SUV), truck, recreational vehicle (RV), boat, plane or other mobile machine for transporting people or goods. It should be noted that the illustrated system 100-A is merely an example, and more, fewer, and/or differently located elements may be used.

The vehicle 102 may comprise a hybrid transmission 106 mechanically connected to an engine 108 and a drive shaft 110 driving wheels 109. A hybrid powertrain controller (hereinafter, powertrain controller) 104 may control engine 108 operating components (e.g., idle control components, fuel delivery components, emissions control components, etc.) and monitor status of the engine 108 operation (e.g., status of engine diagnostic codes). The hybrid transmission 106 may also be mechanically connected to one or more electric machines 114 capable of operating as a motor or a generator. The electric machines 114 may be electrically connected to an inverter system controller (hereinafter, inverter) 118 providing bi-directional energy transfer between the electric machines 114 and at least one traction battery 116.

The traction battery 116 may comprise one or more battery cells (not illustrated), e.g., electrochemical cells, capacitors, or other types of energy storage device implementations. The battery cells may be arranged in any suitable configuration and configured to receive and store electric energy for use in operation of the vehicle 102. Each cell may provide a same or different nominal threshold of voltage. The battery cells may be further arranged into one or more arrays, sections, or modules further connected in series, in parallel, or a combination thereof.

A bussed electrical center (BEC) 112 of the traction battery 116 may be electrically connected to the battery cells and may include a plurality of connectors and switches allowing a selective supply and withdrawal of electric energy to and from the traction battery 116. A battery controller 126 may be configured to monitor and control operation of the BEC 112, such as, but not limited to, by commanding the BEC 112 to selectively open and close one or more switches.

The traction battery 116 typically provides a high voltage (HV) direct current (DC) output. In a motor mode, the inverter 118 may convert the DC output provided by the traction battery 116 to three-phase AC as may be required for proper functionality of the electric machines 114. In a regenerative mode, the inverter 118 may convert the three-phase AC output from the electric machines 114 acting as generators to the DC required by the traction battery 116. In addition to providing energy for propulsion, the traction battery 116 may provide energy for high voltage loads, such as an electric air conditioning (eAC) system, and positive temperature coefficient (PTC) heater, and low voltage loads, such as electrical accessories, an auxiliary 12-V battery, and so on.

The vehicle 102 may be configured to recharge the traction battery 116 via a connection to a power grid. The vehicle 102 may, for example, cooperate with electric vehicle supply equipment (EVSE) 120 of a charging station to coordinate the charge transfer from the power grid to the traction battery 116. In one example, the EVSE 120 may have a charge connector for plugging into a charge port 122 of the vehicle 102, such as via connector pins that mate with corresponding recesses of the charge port 122. The charge port 122 may be electrically connected to an on-board power conversion controller (hereinafter, charger) 124. The charger 124 may condition the power supplied from the EVSE 120 to provide the proper voltage and current levels to the traction battery 116. The charger 124 may interface with the EVSE 120 to coordinate the delivery of power to the vehicle 102.

The EVSE 120 may be designed to provide single- or three-phase AC or DC power to the vehicle 102. Differences in the charge connector and charging protocol may exist between an AC-, a DC-, and an AC/DC-capable EVSE. The EVSE 120 may further be capable of providing different levels of AC and DC voltage including, but not limited to, Level 1 120-volt (V) AC charging, Level 2 240V AC charging, Level 1 200-450V and 80 amperes (A) DC charging, Level 2 200-450V and up to 200 A DC charging, Level 3 200-450V and up to 400 A DC charging, and so on.

Thus, high voltage hybrid components carrying or having high electrical currents may include, but are not limited to, the traction battery 116, one or more components, e.g., capacitors, inside the inverter 118 system, the electric machines 114, and the high-voltage electrical cables, usually orange in color, that connect the battery 116, the inverter 118, and the electric machines 114 to one another. As one non-limiting example, a high voltage system may be defined as a circuit having voltage of greater than 50V. As described in further detail in reference to at least FIG. 1B, the high voltage system components may be monitored by one or more corresponding controllers 160, such that, when any portion of the high voltage system is experiencing a fault or is being powered down and/or discharged, the monitoring controllers 160 may communicate voltage values via an in-vehicle network.

The high voltage system may need to be powered down and high voltage components discharged during routine maintenance or diagnostics of high-voltage cables, system components, and so on. For example, disconnecting the high voltage components can be useful when diagnosing a ground fault on the vehicle 102. High voltage system power down and/or discharge procedure may include one or more steps completed in a predefined sequence or a set of procedures and checks that need not follow a predefined order. In some cases, maintenance and other work may be performed on the vehicle 102, following completion of predefined steps and procedures, including confirming that voltage readings received at a service diagnostic tool indicate that all sources of high voltage have been isolated or discharged.

One of the steps in powering down or discharging the high voltage vehicle system may include disconnecting and/or removing a service disconnect switch, turning a safety switch to OFF, and so on to mechanically isolate one or more portions of the high voltage system. The service disconnect switch may be disposed, for example, inside or outside the traction battery assembly and may include an outer shell sized to house a plurality of circuit elements, sensors, and so on. A pair of electrical contacts or terminals connected with the circuit elements about a first end may extend outward from the shell and may be configured to connect to and electrically complete the high voltage circuit. Thus, disconnecting and removing the service disconnect switch may interrupt power flow within the high voltage system and cause the components to power down or discharge. Additionally or alternatively, connecting the service disconnect switch such that the switch terminals electrically connect with the corresponding contacts of the high voltage system may complete the high voltage circuit and cause the high voltage system to activate and its subcomponents to be powered up or charged.

Each of the powertrain controller 104 and the battery controller 126 may be electrically connected to and in communication with one or more other vehicle controllers, such as the inverter 118, the charger 124, and so on. The powertrain controller 104, the battery controller 126, and other vehicle controllers may be further configured to communicate with one another and with other components of the vehicle 102 via one or more in-vehicle networks, such as, but not limited to, one or more of a vehicle controller area network (CAN), an Ethernet network, and a media oriented system transfer (MOST), as some examples.

Figure 1B:
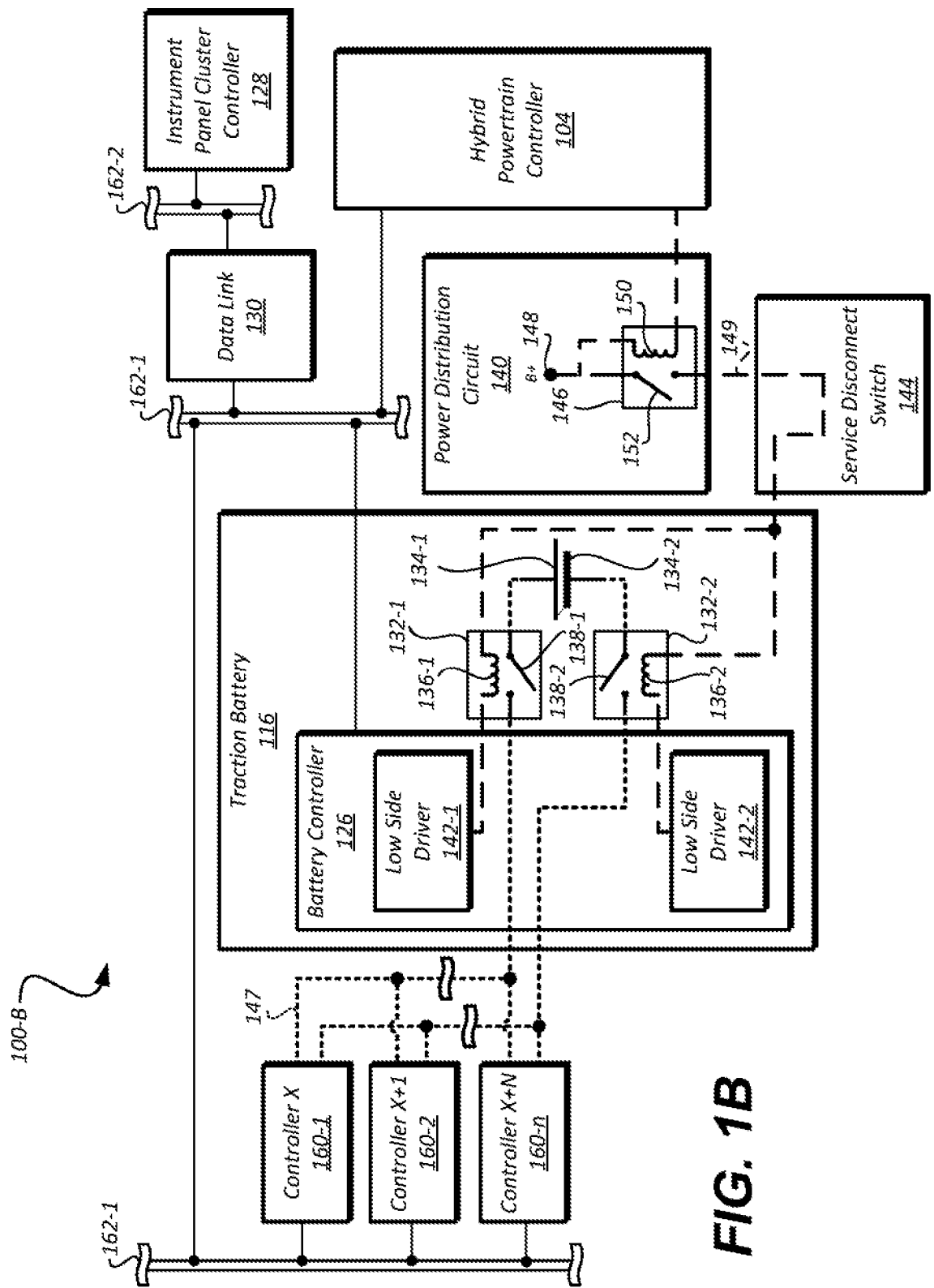
FIG. 1B is a block diagram illustrating a vehicle power distribution system.

FIG. 1B illustrates an example vehicle power distribution system 100-B for diagnosing one or more operating conditions of the high voltage system. Each of a positive main contactor 132-1 and negative main contactor 132-2 may be electrically connected to a positive terminal 134-1 and negative terminal 134-2 of the traction battery 116, respectively, such that closing both contactors 132 may permit supply and withdrawal of high voltage 147 energy to and from one or more cells of the traction battery 116. In some examples, the contactors 132 may be disposed within the BEC 112 of the traction battery 116, as described, for example, in reference to at least FIG. 1A. The contactors 132 may each define an electro-mechanical device including an inductive coil 136 and a corresponding relay 138, such that energizing the inductive coil 136 using the low voltage 149 power causes the corresponding relay 138 to close and/or causes the corresponding relay 138 to remain closed to provide high voltage power 147. Additionally or alternatively, interrupting a supply of low voltage 149 power to or de-energizing the inductive coil 136 causes the corresponding relay 138 to open and/or causes the corresponding relay 138 to remain open to interrupt supply of the high voltage 147.

In one example, the battery controller 126 may include a pair of low side driver circuits 142, each configured to provide a switched ground connection to the corresponding inductive coil 136. As some non-limiting examples, the low side driver circuits 142 may comprise one or more switching semiconductor components controlled by the battery controller 126, such that closing the switching component of the low side driver 142-1 provides a ground connection to activate the inductive coil 136-1 and closing the switching component of the low side driver 142-2 provides a ground connection to activate the inductive coil 136-2.

A power distribution circuit 140 may be electrically connected to an opposite side of the inductive coils 136 from that of the corresponding driver circuit 142 and may be configured to provide a positive potential to power the inductive coils 136. As one example, a power source 148 of the distribution circuit 140 may be electrically connected to provide low voltage 149 power the inductive coils 136. As another example, the distribution circuit 140 may include a supply switch 146 connected electrically in series between the power source 148 and the inductive coils 136, such that low voltage 149 power transfer to the inductive coils 136 may be selectively applied.

A service disconnect switch 144 may be electrically connected between the power source 148 and the inductive coils 136, such that disconnecting or otherwise electrically disengaging the switch 144 interrupts and/or prevents the flow of (low voltage power 149) current to energize the inductive coils 136. In some instances, the service disconnect switch 144 may be electrically in series with the low voltage 149 power source 148. In some other instances, the service disconnect switch 144 may be connected electrically in series between the inductive coils 136 and the supply switch 146.

In one example, the supply switch 146 may include a supply switch inductive coil 150 and a supply switch relay 152, such that energizing the supply switch inductive coil 150 causes the supply switch relay 152 to close to transfer power to the inductive coils 136 and de-energizing the supply switch inductive coil 150 causes the supply switch relay 152 to open to interrupt the power transfer. In some instances, the supply switch inductive coil 150 may be monitored and operated by the powertrain controller 104 that selectively applies and removes a ground connection to energize and de-energize the supply switch inductive coil 150, respectively.

The powertrain controller 104 may energize and de-energize the supply switch inductive coil 150 to cause the supply switch relay 152 to close in response to one or more operating conditions of the vehicle 102 and/or the high voltage system being met, e.g., an ignition ON signal, a connected charger signal, and so on. Additionally or alternatively, the powertrain controller 104 may energize and de-energize the supply switch inductive coil 150 in response to one or more vehicle 102 operating parameters being within a predefined range of a threshold, greater than or less than a threshold. As one example, the powertrain controller 104 may energize the supply switch inductive coil 150 to energize (e.g., using low voltage power 149) the corresponding inductive coils 136 of the contactors 132 and to cause the relays 138 to close, thereby, electrically connecting the traction battery 116 to the rest of the vehicle 102 to enable transfer of high voltage 147 energy to and from the traction battery 116.

Disconnecting the service disconnect switch 144 may open an electrical circuit that provides power to close the main contactors 132. Thus, if the powertrain controller 104 applies a ground connection to close the supply switch relay 152 after the service disconnect switch 144 has been removed or otherwise electrically disconnected, the inductive coils 136 may fail to receive low voltage power and the contactors 132 may remain open. Additionally or alternatively, disconnecting the service disconnect switch 144 during active power transfer to the contactors 132 may cause the contactors 132 to lose the low voltage 149 supply power and the relays 138 to open isolating the traction battery 116 from the vehicle 102.

Each of the battery controller 126 and other vehicle controllers 160-1, 160-2, and 160-$n$ may be configured to monitor a state of each of the main contactors 132, e.g., open, closed, short, stuck open, and so on. The battery controller 126 and the controllers 160-1, 160-2, and 160-$n$ may monitor operating parameters associated with the contactors 132 or other components of the high voltage system of the vehicle 102. In some examples, the controllers 160-1, 160-2, and 160-$n$ may be configured to send, to the battery controller 126, voltage of the main contactors 132 and other high voltage system components. In some other examples, the battery controller 126 may request, from the controllers 160, voltage of the main contactors 132 responsive to detecting that the contactors 132 failed to close or to remain closed during activation of the supply switch 146. In still other examples, the battery controller 126 may be configured to command the instrument panel cluster controller 128 to display a diagnostic notification responsive to at least one of the voltages received from the controllers 160 being greater than a threshold, e.g., 0V. In yet other examples, the battery controller 126 may be configured to command the instrument panel cluster controller 128 to display or issue a high voltage system discharged notification responsive to all voltages received from the controllers 160 being less than a threshold, e.g., 0V.

As one non-limiting example, the powertrain controller 104, the battery controller 126, and the vehicle controllers 160-1, 160-2, and 160-$n$ may communicate with a first set of vehicle systems, subsystems, or components over a first in-vehicle network 162-1 and an instrument panel cluster controller 128 may communicate with a second set of vehicle systems, subsystems, or components over a second in-vehicle network 162-2. The networks 162-1 and 162-2 may support same or different communication protocols with one another and may be connected to a data link device 130 configured to coordinate bi-directional data transfer between the networks 162-1 and 162-2. In some instances, the data link device 130 may be configured to electrically interface with a stand-alone diagnostic tool to provide bi-directional data transfer between the tool and one or more vehicle controllers via the in-vehicle networks.

It should be noted, that, in other examples, the powertrain controller 104, the battery controller 126, the instrument panel cluster controller 128, and the controllers 160 may be connected to more or fewer in-vehicle networks 162. Additionally or alternately, one or more vehicle 102 systems, subsystem, or components may be connected to the vehicle controllers 160 via different in-vehicle networks 162 than described, or directly, e.g., without connection to an in-vehicle network and/or a connection to a data link device.

As some non-limiting possibilities, the vehicle controllers 160 may include those described in reference to FIG. 1A, such as, the powertrain controller 104, the inverter 118, the charger 124, the DC/DC converter controller, the eAC controller, the PTC heater controller, as well as, other high voltage or low voltage system controllers. The instrument panel cluster controller 128 include (or be in communication with) a body controller configured to manage various power control functions such as exterior lighting, interior lighting, keyless entry, remote start, and point of access status verification (e.g., closure status of the hood, doors and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

While FIG. 1-A illustrates the powertrain controller 104, the inverter 118, the charger 124, the battery controller 126, the instrument panel cluster controller 128, and the controllers 160 as being separate components, the vehicle 102 may include more or fewer controllers arranged in similar or different ways. Each of the controllers of the vehicle 102 may include one or more processors connected with both a memory and a computer-readable storage medium and configured to perform instructions, commands, and other routines in support of the processes described herein. For instance, the processor of a given controller may be configured to execute instructions of vehicle applications to provide features such as diagnostic notifications, navigation, satellite radio decoding, and hands-free calling. Such instructions and other data may be maintained within the corresponding controller, or combination of controllers, in a non-volatile manner using a variety of types of computer-readable storage medium. The computer-readable medium (also referred to as a processor-readable medium or storage) includes any non-transitory (e.g., tangible) medium that participates in providing instructions or other data that may be read by the processor of the controller. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Figure 2:
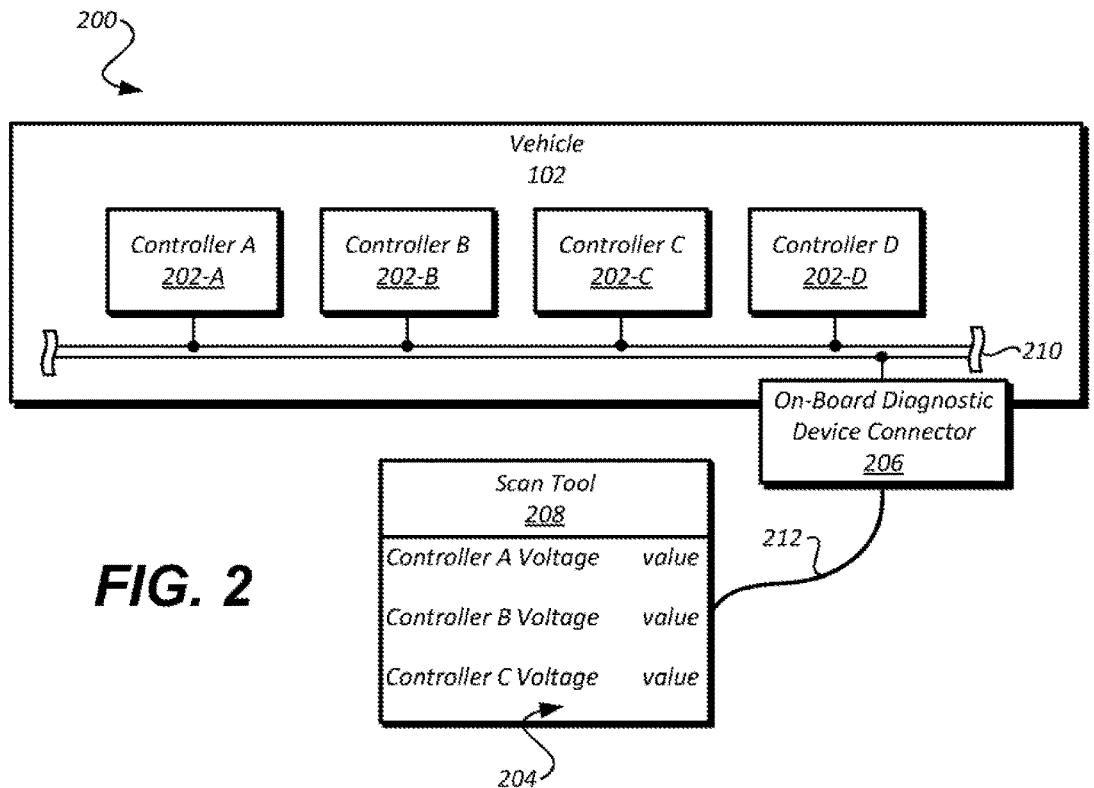
FIG. 2 is a block diagram illustrating a service tool notification system.

FIG. 2 illustrates an example on-board diagnostics system 200 for one or more controllers 160 of the vehicle 102. A diagnostic service tool (hereinafter, service tool) 208 may be a device configured to connect 212 to the vehicle 102 via an on-board diagnostic device connector (device connector) 206 to establish communication with one or more high voltage system controllers 202. The device connector 206 may be a hardware interface having a plurality of terminals or pins (not illustrated) and may be compliant with one or more vehicle diagnostic standards, such as, but not limited to, the on-board diagnostics (OBD) standard and associated communication protocols, e.g., SAE J1850 pulse-width modulation (PWM) protocol, SAE J1850 variable pulse width protocol, ISO 9141-2 protocol, ISO 1430 KWP2000 protocol, ISO 15765 CAN protocol, and so on.

The service tool 208 may be configured to receive voltage values measured at the high voltage controllers 202 and delivered to the device connector 206 via a data connection 210. In one example, the high voltage system controllers 202 may send to the service tool 208 signals indicating voltages of one or more of the controllers 202 or their subsystems and subcomponents.

The service tool 208 may display the received voltage values on a corresponding display 204. The display 204 may be configured to receive input from human-machine interface (HMI) controls, e.g., one or more buttons, configured to provide for user interaction with the service tool 208 to invoke vehicle 102 functions, such as during troubleshooting or diagnostic procedures. Thus, the display 204 may be configured to display various types of information provided by various controllers of the vehicle 102.

In some examples, following removal of the service disconnect switch, the display 204 of the service tool 208 may indicate that corresponding voltages of one or more of the high voltage system controllers 202 are zero (0) volts. Thus, the user may be notified what the received voltage values are, however, they may still not know whether the high voltage system of the vehicle 102 has been powered down and various electrical components discharged. As one example, one of the controllers 202, e.g., the controller D 202-D, may be connected to the data connection 210, but may not send one or more detected voltages to the service tool 208. As another example, due to a space limit of the display 204, the reported voltage of the controller D 202-D may need to be separately located by the user within menus, submenus, display layouts, and so on. Said another way, the user may need to know which controllers 202 are part of the high voltage system and would, thus, need to be powered down or discharged to perform high voltage system maintenance. The user may further need to interrogate individual controllers 202 via the service tool 208 and/or visually monitor the display 204 of the service tool 208 to confirm that voltage values of each controller 202 are less than a threshold.

Figure 3:
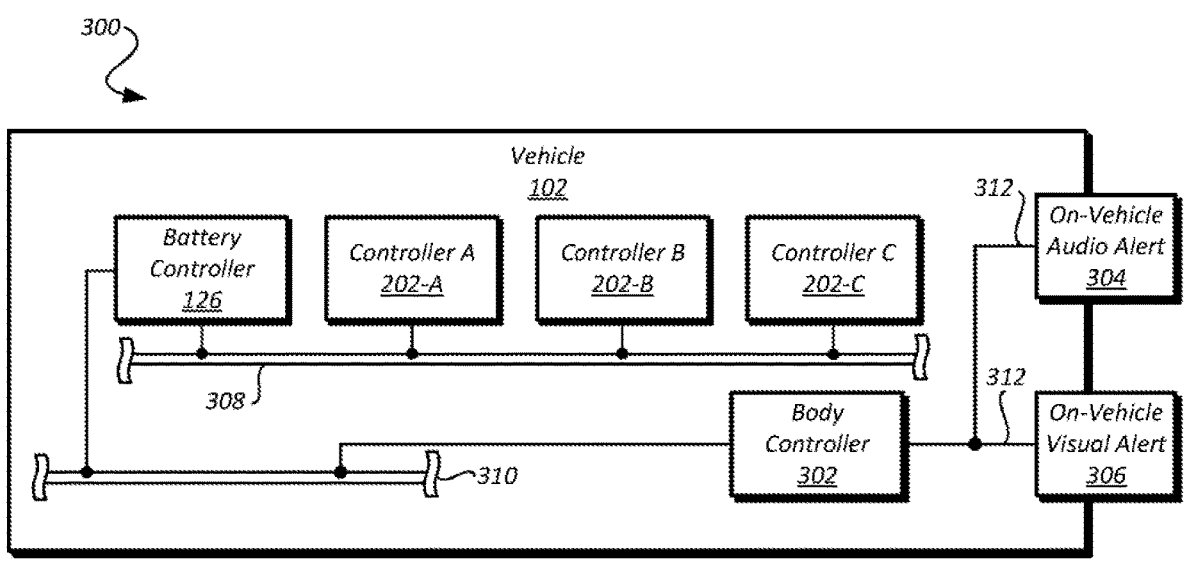
FIG. 3 is a block diagram illustrating an on-vehicle alert notification system.

FIG. 3 illustrates an example user notification system 300 for issuing a notification indicating that all controllers 202 of the vehicle high voltage system have been powered down and/or discharged. The system 300 may include a body controller 302 connected 312 to and in communication with an on-vehicle audio alert (hereinafter, an audio alert) 304 and/or an on-vehicle visual alert 306. The body controller 302 may be configured to monitor and control operation of the audio alert 304 and visual alert 306, such that the body controller 302 may selectively activate, turn on, or enable and deactivate, turn off, or disable the alerts. Examples of an audio alert include, but are not limited to, a chime, a horn, and so on. Examples of a visual alert include, but are not limited to, a headlight, an overhead dome light, and so on.

It should be noted that the audio alert 304 may include additional or alternative sound notifications, such as, but not limited to, chimes, pre-recorded audio messages, and so on, reproduced using vehicle 102 audio system and other methods. As some non-limiting examples, the audio alert 304 may include audible chimes associated with a vehicle door ajar chime, seatbelt warning chime, trunk ajar chime, and so on. The visual alert 306 may include visual notifications, such as, but not limited to, flashing or illuminating instrument panel lights, tailgate lights, backup lights, turn signal lights, and so on. In some other examples, the visual alert 306 may include varying output brightness of interior or exterior vehicle lights, such as by alternating between dimming and brightening the lights. In still other examples, the visual alert 306 may include rapidly changing a state of the interior or exterior vehicle lights, such as by repeatedly turning the lights on and off within a short period of time.

The body controller 302 may be connected 310 to and in communication with the battery controller 126. It should be noted, that one or more operations, described herein as being completed by one of the battery controller 126 or the body controller 302, may be completed by the powertrain controller 104 or another controller of the vehicle 102. In one example, the body controller 302 may receive from the battery controller 126 a signal indicating that all controllers 202 monitoring the vehicle high voltage system have indicated measured voltage to be approximately 0V. Thus, the battery controller 126 may indicate that the vehicle high voltage system components have been powered down or discharged. Responsive to the notification, the body controller 302 may activate at least one of the audio alert 304 and visual alert 306 indicating to the user that the high voltage system of the vehicle 102 has been powered down or discharged. Additionally or alternatively, the body controller 302 may receive, from the battery controller 126, a signal indicating that voltage of at least one of the controllers 202 monitoring the vehicle high voltage system is greater than a threshold; the body controller 302 may then issue a corresponding diagnostic alert notification to the technician.

In one example, the battery controller 126 may request corresponding voltages from each of the controllers 202, responsive to detecting that the contactors 132 opened or remained open after the supply switch 146 has been closed to transfer energy to the inductive coils 136. For instance, the battery controller 126 may be connected 308 to and in communication with all controllers 202 that are part of the vehicle 102 high voltage system. Thus, either periodically, responsive to a request, or some combination of these, the high voltage system controllers 202 may be configured to send to the battery controller 126 voltages detected at corresponding system nodes.

The battery controller 126 may be configured to compare the received voltages to a threshold and, responsive to all received voltages being less than a threshold, may command the body controller 302 to activate at least one of the horn and the headlights indicating to the user that the high voltage system of the vehicle 102 has been powered down and/or discharged. Additionally or alternatively, responsive to at least one of the voltages received from the controllers 202 being greater than a threshold, the battery controller 126 may be configured to command the body controller 302 to activate a diagnostic alert notification indicating to the user that an error occurred.

Figure 4:
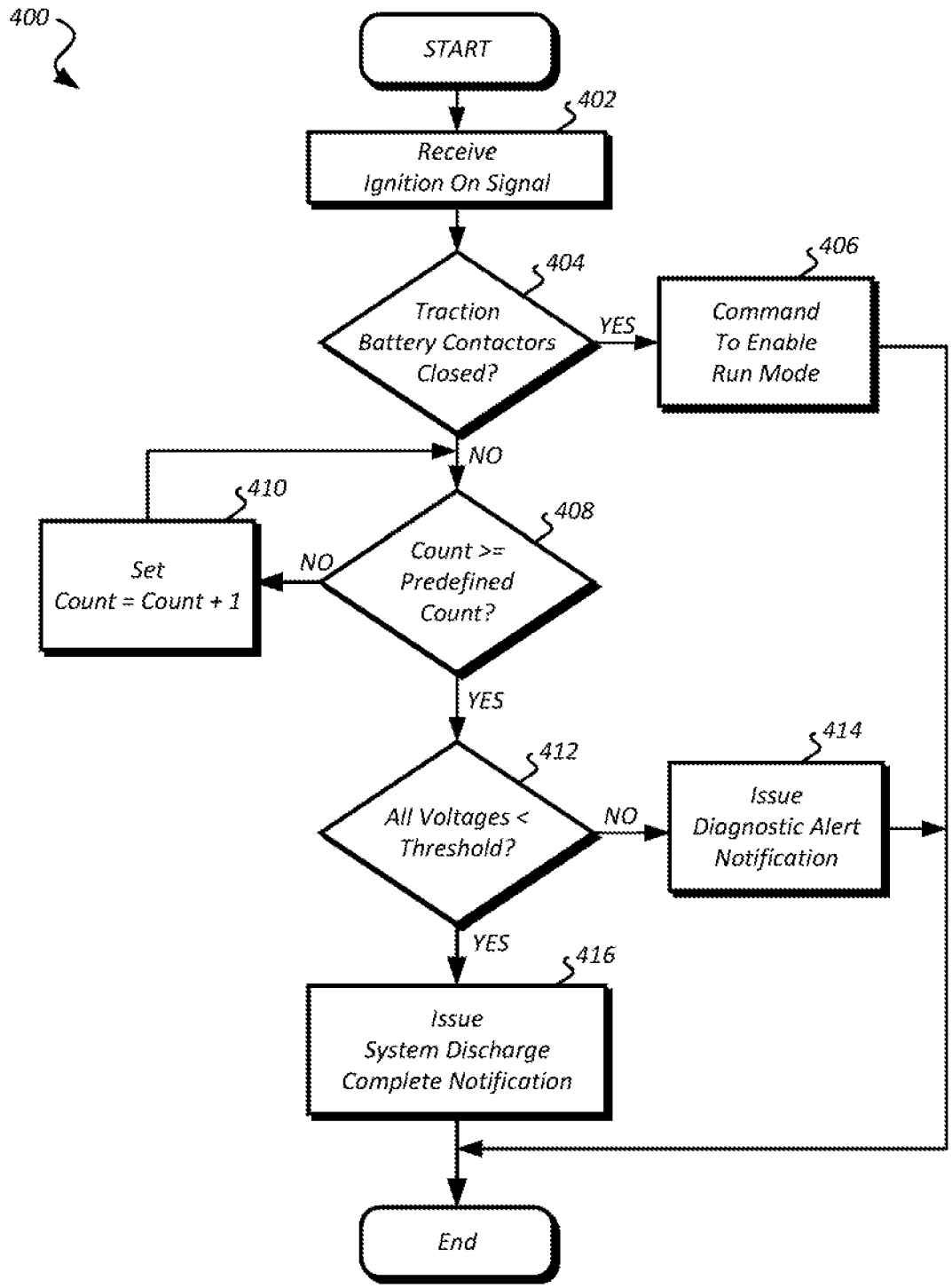
FIG. 4 is a flowchart illustrating an algorithm for issuing an on-vehicle alert notification.

FIG. 4 illustrates an example process 400 for issuing a user notification that a high voltage system of the vehicle has been powered down and/or discharged. It should be noted, that one or more operations, described herein as being completed by one of the powertrain controller 104, the battery controller 126, and the body controller 302, may be completed by another controller or a combination of the vehicle 102 controllers. The process 400 may begin at operation 402 where the vehicle 102 controller, e.g., the powertrain controller 104, receives a signal indicative of an ignition ON request. In one example, responsive to an ignition ON request, the powertrain controller 104 may provide power to close the main positive and negative contactors 132, such as by applying a ground connection to energize the supply switch inductive coil 150 thereby causing the supply switch relay 152 to close. At operation 404, the powertrain controller 104 may determine whether the main positive and negative contactors 132 of the traction battery 116 are closed. The process 400 may proceed to operation 406 responsive to the contactors 132 being closed following low voltage power being provided to energize the corresponding inductive coils 136. At operation 406, the powertrain controller 104 may issue one or more commands to enable a run mode of the vehicle 102.

In one example, the battery controller 126 may detect that the main contactors 132 following closing of the supply switch 146 to provide power to energize the inductive coils 136. As described in reference to at least FIGS. 1A-1B, the main contactors 132 may open or may remain open following closing of the supply switch 146 in response to the service disconnect switch 144 having been removed or turned off thereby opening a low voltage power supply circuit of the inductive coils 136.

If the contactors 132 are open after the flow of power to close the relays 138 has been enabled, the powertrain controller 104 may request the battery controller 126 to confirm that the high voltage system has been discharged or powered down. The battery controller 126, in communication with the controllers 160, may maintain a present count or a value representative of a number of voltages received from the controllers 160 monitoring the high voltage system of the vehicle 102. At operation 408, the battery controller 126 compares a present count value, i.e., a value indicating a number of voltages received from the controllers 160 or a number of the controllers 160 that reported voltage, to a predefined count, such as to a count representative of a number of the controllers 160 monitoring the high voltage system of the vehicle 102. The process 400 may proceed to operation 410 where the battery controller 126 may increase the present count by one (1), responsive to the present count of voltage values being less than a number of the controller 160 monitoring the high voltage system of the vehicle 102. In some examples, the battery controller 126 may then return to monitoring a number of voltages received from the controllers 160.

In response to a number of voltages received from the controller 160 being greater than or equal to a number of the controllers 160 that monitoring the high voltage system, the battery controller 126 may determine, at operation 412, whether each of the voltages received from the monitoring controllers 160 are less than a voltage threshold. In one example, the battery controller 126 may determine whether the received voltages are approximately equal to 0V. The battery controller 126, at operation 414, may issue a diagnostic alert notification indicating that not all controllers 160 reported voltages that approximately equal to 0V in response to at least one received voltage being greater than a voltage threshold.

At operation 416, responsive to all voltages received from the controllers 160 being less than a voltage threshold, e.g., being approximately equal to 0V, the battery controller 126 may issue a notification indicating that the high voltage system has been powered down or discharged. In one example, the battery controller 126 may issue one of the audio alert 304 and visual alert 306 indicating that the high voltage system has been powered down or discharged by controlling operation of a vehicle 102 horn and/or vehicle 102 headlights. The battery controller 126 may, for instance, selectively activate, turn on, or enable and deactivate, turn off, or disable the horn and/or the headlights of the vehicle 102 indicating that the high voltage system has been powered down or discharged. In another example, the battery controller 126 may issue additional or alternative sound notification indicating that the high voltage system has been powered down or discharged, such as, but not limited to, activating chimes, pre-recorded audio messages, and so on, reproduced using vehicle 102 audio system and other methods.

As some non-limiting examples, in response to the high voltage system being powered down or discharged, the battery controller 126 may activate audible chimes associated with a vehicle door ajar chime, seatbelt warning chime, trunk ajar chime, and so on. In still another example, the battery controller 126 may issue additional or alternative audible notification indicating that the high voltage system has been powered down or discharged, such as, but not limited to, by flashing or illuminating instrument panel lights, tailgate lights, backup lights, turn signal lights, and so on, by varying output brightness of interior or exterior vehicle lights, e.g., by alternating between dimming and brightening the lights, or by rapidly changing a state of the interior or exterior vehicle lights, e.g., by repeatedly turning the lights on and off within a short period of time. The process 400 may then end. In some examples, the process 400 may be repeated in response to receiving an ignition ON request or in response to receiving another signal or command.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    main contactors powered via a low voltage bus and disposed electrically between a traction battery and a high voltage bus; and
    a controller configured to, responsive to the contactors remaining open following activation of the low voltage bus and reported voltage values associated with the high voltage bus being less than a threshold, operate a horn of the vehicle to issue a system discharge notification.

2. The vehicle of claim 1, wherein the activation is caused by a vehicle on command.

3. The vehicle of claim 1 further comprising a service disconnect switch, disposed between the low voltage bus and the high voltage bus, configured to, when open, prevent the contactors from closing following the activation.

4. The vehicle of claim 1, wherein the controller is further configured to, responsive to the contactors remaining open following the activation, request the reported voltage values.

5. The vehicle of claim 4 further comprising other controllers configured to, responsive to receiving the request, generate the reported voltage values.

6. The vehicle of claim 5, wherein the other controller is an inverter controller, an on-board charger controller, a DC/DC converter controller, an electric air conditioning (eAC) controller, or a positive temperature coefficient (PTC) heater controller.

7. The vehicle of claim 1, wherein the controller is further configured to operate an exterior light of the vehicle.

8. A method for a vehicle, comprising:
    by a controller, responsive to main contactors, powered via a low voltage bus and disposed electrically between a traction battery and a high voltage bus, remaining open following activation of the low voltage bus and reported voltage values associated with the high voltage bus being less than a threshold, operating a horn of the vehicle or flashing exterior lights of the vehicle to provide a system discharge notification.

9. The method of claim 8, wherein the activation is caused by a vehicle on command.

10. The method of claim 8, wherein the contactors remaining open following the activation is responsive to a service disconnect switch disposed electrically in series between a power source of the low voltage bus and the contactors being open.

11. The method of claim 8 further comprising requesting, from other controllers, the reported voltage values responsive to the contactors remaining open following the activation.

12. The method of claim 11, wherein the other controllers are configured to, responsive to receiving the request, generate the reported voltage values.

13. The method of claim 12, wherein the other controllers include an inverter controller, an on-board charger controller, a DC/DC converter controller, an electric air conditioning (eAC) controller, or a positive temperature coefficient (PTC) heater controller.

14. The method of claim 8, wherein the flashing includes dimming or brightening the exterior lights.

15. A system for a vehicle comprising:
    main contactors electrically powered by a low voltage bus and disposed electrically between a traction battery and a high voltage bus; and
    a controller configured to, responsive to the contactors remaining open following activation of the low voltage bus and reported voltage values associated with the high voltage bus being less than a threshold, operate exterior lights of the vehicle to provide a system discharge notification.

16. The system of claim 15, wherein operating the exterior lights includes dimming or brightening the exterior.

17. The system of claim 15 further comprising a service disconnect switch configured to, when open, prevent the contactors from closing following the activation.

18. The system of claim 15, wherein the controller is further configured to, responsive to the contactors remaining open following the activation and at least one of the reported voltage values being greater than the threshold, issue a diagnostic alert notification.

19. The system of claim 15, wherein the controller is further configured to, responsive to the contactors remaining open following activation of the low voltage bus and the reported voltage values associated with the high voltage bus being less than a threshold, operate a horn or chime of the vehicle.

20. The system of claim 19, wherein the chime is a door alert chime, a seatbelt alert chime, or a trunk alert chime.

* * * * *